(12) United States Patent
Catherman et al.

(10) Patent No.: US 7,751,568 B2
(45) Date of Patent: Jul. 6, 2010

(54) METHOD FOR SECURELY CREATING AN ENDORSEMENT CERTIFICATE UTILIZING SIGNING KEY PAIRS

(75) Inventors: Ryan Charles Catherman, Raleigh, NC (US); David Carroll Challener, Raleigh, NC (US); James Patrick Hoff, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1282 days.

(21) Appl. No.: 10/749,261

(22) Filed: Dec. 31, 2003

(65) Prior Publication Data

US 2005/0149733 A1    Jul. 7, 2005

(51) Int. Cl.
*H04K 1/00* (2006.01)

(52) U.S. Cl. .................. 380/270; 380/30; 713/156; 713/173; 713/176

(58) Field of Classification Search .............. 380/270, 380/30; 713/176, 156, 173
See application file for complete search history.

(56) References Cited

U.S. PATENT DOCUMENTS

| | | | | |
|---|---|---|---|---|
| 6,185,678 B1 * | 2/2001 | Arbaugh et al. | ............ | 713/2 |
| 6,233,685 B1 * | 5/2001 | Smith et al. | ............ | 713/194 |
| 6,347,374 B1 * | 2/2002 | Drake et al. | ............ | 726/1 |
| 6,609,199 B1 * | 8/2003 | DeTreville | ............ | 713/172 |
| 6,704,868 B1 * | 3/2004 | Challener et al. | ............ | 713/168 |
| 6,823,454 B1 * | 11/2004 | Hind et al. | ............ | 713/168 |
| 6,826,690 B1 * | 11/2004 | Hind et al. | ............ | 713/186 |
| 6,839,841 B1 * | 1/2005 | Medvinsky et al. | ............ | 713/175 |
| 6,886,095 B1 * | 4/2005 | Hind et al. | ............ | 713/168 |
| 6,925,560 B1 * | 8/2005 | Basquin | ............ | 713/169 |
| 6,957,344 B1 * | 10/2005 | Goldshlag et al. | ............ | 713/194 |
| 6,973,191 B2 * | 12/2005 | Audebert et al. | ............ | 380/277 |
| 6,980,660 B1 * | 12/2005 | Hind et al. | ............ | 380/282 |
| 7,103,771 B2 * | 9/2006 | Grawrock | ............ | 713/155 |
| 7,263,608 B2 * | 8/2007 | Challener et al. | ............ | 713/156 |
| 7,380,119 B2 * | 5/2008 | Bade et al. | ............ | 713/155 |
| 7,644,278 B2 * | 1/2010 | Catherman et al. | ............ | 713/175 |
| 2002/0059286 A1 * | 5/2002 | Challener | ............ | 707/100 |
| 2002/0095587 A1 * | 7/2002 | Doyle et al. | ............ | 713/186 |
| 2002/0099822 A1 * | 7/2002 | Rubin et al. | ............ | 709/225 |

(Continued)

OTHER PUBLICATIONS

Sundeep Bajikar; Trusted Platform Module Based Security on Notebook PCs-White Paper; Mobile Platforms Group; Intel Corporation; Jun. 20, 2002.*

(Continued)

*Primary Examiner*—Michael J Simitoski
*Assistant Examiner*—James Turchen
(74) *Attorney, Agent, or Firm*—Dillon & Yudell LLP (57) ABSTRACT

A method and system for ensuring security-compliant creation and certificate generation for endorsement keys of manufactured TPMs. The endorsement keys are generated by the TPM manufacturer and stored within the TPM. The TPM manufacturer also creates a signing key pair and associated signing key certificate. The signing key pair is also stored within the TPM, while the certificate is provided to the OEM's credential server. During the endorsement key (EK) credential process, the TPM generates a signed endorsement key, which comprises the public endorsement key signed with the public signing key. The credential server matches the public signing key of the endorsement key with a public signing key within the received certificate. The EK certificate is generated and inserted into the TPM only when a match is confirmed.

20 Claims, 5 Drawing Sheets

U.S. PATENT DOCUMENTS

| | | | |
|---|---|---|---|
| 2002/0129261 A1* | 9/2002 | Cromer et al. | 713/193 |
| 2002/0138735 A1* | 9/2002 | Felt et al. | 713/176 |
| 2002/0169717 A1* | 11/2002 | Challener | 705/40 |
| 2002/0199110 A1 | 12/2002 | Kean | |
| 2003/0074557 A1* | 4/2003 | Vatanen | 713/168 |
| 2003/0097565 A1* | 5/2003 | Wheeler et al. | 713/171 |
| 2003/0097569 A1* | 5/2003 | Wheeler et al. | 713/176 |
| 2003/0105965 A1* | 6/2003 | Challener | 713/184 |
| 2003/0174842 A1* | 9/2003 | Challener | 380/277 |
| 2003/0233550 A1* | 12/2003 | Brickell | 713/171 |
| 2004/0030901 A1* | 2/2004 | Wheeler et al. | 713/176 |
| 2004/0054901 A1* | 3/2004 | England et al. | 713/168 |
| 2004/0098592 A1* | 5/2004 | Taki | 713/176 |
| 2004/0143738 A1* | 7/2004 | Savage et al. | 713/168 |
| 2004/0147251 A1* | 7/2004 | Nakayama et al. | 455/414.2 |
| 2004/0168055 A1* | 8/2004 | Lord et al. | 713/156 |
| 2005/0018851 A1* | 1/2005 | Venkatesan et al. | 380/277 |
| 2005/0021968 A1* | 1/2005 | Zimmer et al. | 713/176 |
| 2005/0027979 A1* | 2/2005 | Peck et al. | 713/161 |
| 2005/0033987 A1* | 2/2005 | Yan et al. | 713/201 |
| 2005/0039013 A1* | 2/2005 | Bajikar et al. | 713/172 |
| 2005/0039016 A1* | 2/2005 | Aissi et al. | 713/176 |
| 2005/0108534 A1* | 5/2005 | Bajikar et al. | 713/172 |
| 2005/0132182 A1* | 6/2005 | Challener et al. | 713/150 |
| 2005/0132194 A1* | 6/2005 | Ward | 713/176 |
| 2005/0137889 A1* | 6/2005 | Wheeler | 705/1 |
| 2005/0138384 A1* | 6/2005 | Brickell et al. | 713/182 |
| 2005/0138389 A1* | 6/2005 | Catherman et al. | 713/185 |
| 2005/0149733 A1* | 7/2005 | Catherman et al. | 713/175 |
| 2006/0072747 A1* | 4/2006 | Wood et al. | 380/44 |
| 2006/0198514 A1* | 9/2006 | Lyseggen et al. | 380/28 |

OTHER PUBLICATIONS

TCPA Main Specification Version 1.1b; Trusted Computing Group; Feb. 22, 2002.*

Practical UNIX & Internet Security; Simson Garfinkel & Gene Spafford; ISBN 1-56592-148-8, 1004 pages. Second Edition, Apr. 1996.*

* cited by examiner

METHOD FOR SECURELY CREATING AN ENDORSEMENT CERTIFICATE UTILIZING SIGNING KEY PAIRS

RELATED APPLICATIONS

The present invention is related to the subject matter of the following commonly assigned, copending U.S. patent application Ser. No. 10/750,594 entitled "Method for Securely Creating An Endorsement Certificate in an Insecure Environment" and filed Dec. 31, 2003.

BACKGROUND OF THE INVENTION

1. Technical Field

The present invention relates generally to security features for computer systems and in particular to providing security features during manufacture and authentication of trusted platform modules (TPMs). Still more particularly, the present invention relates to a method and system for providing trustworthy endorsement certificates during manufacture of platforms using TPMs and the Endorsement Credential of that platform for that TPM.

2. Description of the Related Art

As the use of computers to conduct day-to-day business communication (information exchange) via computer networks increases, providing reliable/trustworthy encryption capabilities for each computer system has become a vital consideration in the manufacturing process for new systems. Even for computers utilized to carry out personal enterprises, such as Internet-based transactions, system (and network) security during these transactions is important.

One conventional method of providing security for information exchange via computer networks involves the utilization of certificate encryption. Certificate encryption involves the utilization of public-private key cryptography (e.g., asymmetric cryptography). In order to provide this method of encryption, some sort of certification mechanism is required by which a certificate is provided by a trusted source to verify the trustworthiness of the encryption pair for a particular computer system. Those skilled in the computer arts are familiar with asymmetric cryptography and the implementation of public-private key pairs and associated certificate to carry out secure exchange of information between computer systems.

One major safeguard required during manufacture of computing devices that support certificate creation is against breaches in security (or inadequate security) that may result in the use of the private key being compromised. Such breaches may result in a fraudulent injection of an attacker's own public key to generate an endorsement certificate for a device not manufactured with the security safeguards required for a trusted source. An attacker inserts his own key into the process and obtains a certificate made for that key. Also, the endorsement certificate (digital signature) system is susceptible to fraud if the system using the high-value private key of a device is stolen, either by physical theft of the device containing the private key, or by discovery of the private key therein and subsequent copying and use in another device capable of generating endorsement certificates. Most importantly, one must protect the manufacturing environment such that the machine containing the high-value certification key can be assured it is only generating credentials or certificates for machines for which it should generate these credentials.

As will be appreciated, consumer trust is a key component of this system, and a manufacturer must ensure that there are no easy breaches to the system so that consumer trust can be maintained. Typically, users of a computer device are expected to rely upon blind trust in accepting that the device used to generate the certificate has not been stolen and in accepting that the device used to generate the certificate has sufficient safeguards to protect its private key from discovery and use.

With the need for reliable implementation of certificate creation within computer systems permeating the industry, the Trusted Platform Module. (TPM) to implement the specification of the Trusted Computing Group (TCG). The TPM is a chip that is manufactured to provide the encryption functionality in a trusted device, which is manufactured by a trusted source. The specification of the TCG and TPM are available on the web at Internet address trustedcomputing group.org, and relevant content of that site is incorporated herein by reference.

A TPM vendor is required to implement a part that is complaint with the TCG main specification. An OEM of a system that has a TCG complaint part must go to further steps to create a Platform Credential that, in part, contains information about the Endorsement key in the TPM. The actual creation time of the Endorsement key is not important, but it is important that this key be created if a Platform Credential is to be created by the OEM. Since the platform is only in a controlled environment up until it leaves its manufacturing facility, this is when the credential should be created so that the OEM has a level of assurance that any credential it is signing is indeed for a platform created within its secured environment.

The Endorsement key created is a public/private key pair generated internally to a TPM. The public portion is the portion that is signed by the platform manufacturer. The use of this key is further explained in the TCG main specification. Since the OEM must feel assured that it is signing EK public keys from systems that it created, one may envision that a manufacturing facility would have a central machine with a high-value key that creates credentials for all machines within the secure manufacturing facility. However, it is not always feasible to have localized, high-performance cryptographic devices with high-value keys in the same manufacturing environment. Also, there is still no assurance that some attacker has not placed a rogue machine or even just a rogue key request in the facility to be signed.

The manufacturer of the TPM signs a certificate that is physically associated with the TPM. This certificate is tied to the public portion of the endorsement key, and together they confirm that the public key is the endorsement key of this particular TPM. The certificate generation mechanism is require to show public certification of the keys so the users can feel confident that the systems are indeed secure. Thus, there is great value in having the certificate that says that the public key was generated inside of a TPM.

Previously, manufacturers were able to protect their device manufacturing process by manufacturing the devices in OEM owned and operated manufacturing facilities that were safeguarded against external attacks. The devices were thus manufactured in a secure environment (i.e., an environment having a sufficient security rating so as not to compromise the security level of any device manufactured in the environment and one from which an endorsement key could be trusted).

Typically, the manufacturing facility and the secure database (server) are not located at the same physical location, and the former is provided a much less secure environment than the latter. Also, while some OEMs own and control the manufacturing plants in these other locations, others license out the manufacture of the devices to a manufacturing vendor. These vendors often do not have the same sense of urgency or financial ability to provide adequate security against breaches/attacks in the manufacturing process.

With the globalization of the manufacturing workforce, due to economic and other considerations, many companies are now establishing/utilizing manufacturing plants in other locations outside of their direct control and trusted security environment (e.g., countries with cheaper labor). While steps are taken to provide security to these plants and limit their exposure to breaches or attacks, etc. in the manufacturing process, it is more likely and certainly not uncommon for security features of a remote facility to be compromised.

The OEM must protect the key in order to provide a credential for all customers by signing the keys. One method of protecting the key generation process involves placement of very expensive hardware (i.e., an credential server) at each remote manufacturing plant. However, obvious problems with this method includes: (1) controlling security of the "trusted" sever would become even more difficult when the hardware is placed in such a remote location; and (2) even if security could be guaranteed, the expense of providing such high-end secure systems for each manufacturing facility is very impractical (i.e., to expensive to implement).

Conventional credential servers located within the OEM environment must be able to determine/ascertain which keys to sign and which ones not to sign. For example, with 1000 devices in a manufacturing line, the credential server has to sign the endorsement keys being returned to each machine. The credential server needs to know each device from which the server receives a public key is a device that should be provided an EK certification. With no way to ascertain whether the keys were generated within the TPM, the credential server has no way of making this confirmation. Providing an endorsement certificate to even one EK not generated within a TPM of the manufacturer could severely compromise the trust placed in the OEM by the customers who ultimately utilize the devices.

Thus, current manufacturing environments at which TPMs request a certificate from a remotely located trusted source are susceptible to security problems. The lack of security or inadequate security provides little comfort to the OEM that a certificate should be issued for all requests without having to consider the possibility that the process has been tampered with or that private keys have been generated outside of the TPM. A method and system that provides some additional confirmation that an authentication certificate is validly issued to an endorsement key from a key pair generated within a TPM would be a welcomed improvement to the manufacturing process.

SUMMARY OF THE INVENTION

Disclosed is a method and system for ensuring security-compliant creation and signing of endorsement keys of TPMs manufactured in a second party manufacturing facility. The endorsement keys are created as a pair of asymmetric keys with a public key and a private key. These keys are generated by the TPM vendor/manufacturer according to the TCG protocol. Prior to generating the devices, the TPM manufacturer selects a signing key pair and injects the signing key pair into the TPM. The signing key pair is generated for every X machines, where X is a small enough number to discourage an attacker attempting to figure out the secret number while the devices are being manufactured an authenticated and X is large enough to substantially minimize the cost of having to inject a new signing key pair every X devices.

With an X value of 1000, for example, each batch of 1000 machines has the same signing key pair, and the next batch of 1000 has a different signing key pair. The signing key pair is placed inside of the TPM and its private key cannot be read outside of the TPM. Also, the signing key pair is used once by the TPM, is never readable outside the TPM, and is destroyed after it is used.

In an alternate embodiment, X is a time factor and represents the number of devices that can be generated within X time. The time value is selected based on the same two above criteria for the numeric value selection. Thus, with an X value of 6 hours, assuming 1500 devices are manufactured every 6 hours, then each of those 1500 devices share the same secret number while the next 1500 devices share a different secret number.

The TPM manufacturer provides certificates for each public key associated with the X number of TPMs. These certificates are used to verify the signature created by the TPM during the EK creation process. The signing key certificate (which includes the public signing key) is provided to the OEM prior to the manufacture of the devices. During creation of the endorsement key, the TPM returns the public endorsement key as well as the necessary request digest. This digest includes public signing key of the signing key pair. The signing key pair is destroyed once the request digest. This prevents an attacker from being able to crack the number.

When the public/private key pair is used, the server simply verifies the signature of the public key using the public signing key within the certificate provided by the TPM manufacturer to the server (OEM). If the verification is proven, then the credential server can create a certificate for this TPM. In one embodiment, the ability of a TPM to utilize a signing key pair with associated signing key credential is valid for a pre-established time and expires after a passage of that time.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a method and system for verifying that an endorsement key was generated within a TPM before creating an endorsement certificate for the TPM device. The invention eliminates the problems inherent when TPMs are being manufactured in environments that are susceptible to attacks. The invention is described from the perspective of a remote manufacturing environment (i.e., one that is geographically remote from the OEM's credential server). However, the features of the invention may be applicable to all manufacturing environments including those local to the credential server (i.e., one that is owned and controlled by the OEM). The TPMs are manufactured with standard private-public key pairs that require endorsement certificates from a trusted source (per TCG specification, which has been previously incorporated by reference.)

The invention describes a credential server of the OEM as the trusted source. Implementation of the invention requires some hardware/software overhead in both the TPM and the credential server, as well as some additions to the manufacturing process. As described, the hardware/software overhead includes a register comprised of a selected number of bits and, in one embodiment, logic for hashing the value within the register with the public key of the key pair.

Figure 1:
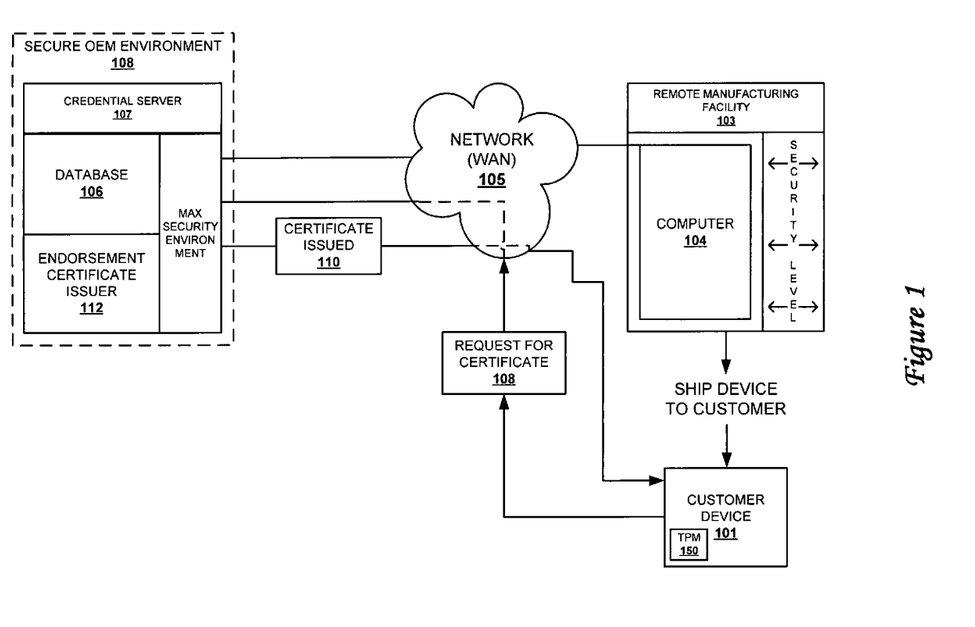
FIG. 1 is a system diagram depicting a TPM manufacturing plant, customer device, and central certificate server, which collectively provide the environment within which the certificate authentication process of the present invention is completed.

The invention is best understood with reference to the various figures of which FIG. 1 provides a general overview of the manufacturing and authentication environments (or systems), within which the features of the invention are implemented. As provided by FIG. 1, remote manufacturing plant 103 includes a computer 104, which is utilized during the manufacturing process to complete several controllable (programmable) processes, such as injecting a selected/generated endorsement key pair and signing key pair into the TPMs. Manufacturing plant 103 manufactures customer devices (or platforms) 101 that include a TPM chip created for an original equipment manufacturer (OEM). The OEM environment 108 includes a credential server 107 with a high security value. Credential server 107 comprises a high-end processing component and affiliated database 106, within which is stored a record of issued endorsement certificates and signing key certificates received from the manufacturing plant's computer 104 (or personnel) via some secure transfer.

Remote manufacturing plant 103 is communicatively connected to credential server 107 via network 105, which may be a WAN or LAN depending on the remoteness of the remote manufacturing plant 103 from the OEM environment 108 and the level of network security desired. Network 105 may be utilized to pass secure information between remote manufacturing plant 103 and credential server 107. As will be described in greater details below, customer device 101 comprises a TPM 150 which issues an endorsement key request 110 for an endorsement certificate to credential server 107 and, in return, receives an endorsement certificate 112 from credential server 107 during the authentication process.

Both credential server 107 (within OEM environment 108) and remote manufacturing plant 101 have some level of security, indicated by security columns to the right of each block. Credential server 107 is maintained with maximum security, while remote manufacturing plant 101 has some security value between minimum and maximum security levels. The invention assumes that the level of security at credential server 107 is necessarily at a highest level, while that of remote plant is not necessarily so. The invention operates within that overall system environment to allow a less than completely secure manufacturing facility to still be provided endorsement certificates for the manufactured TPM key pairs.

Figure 2:
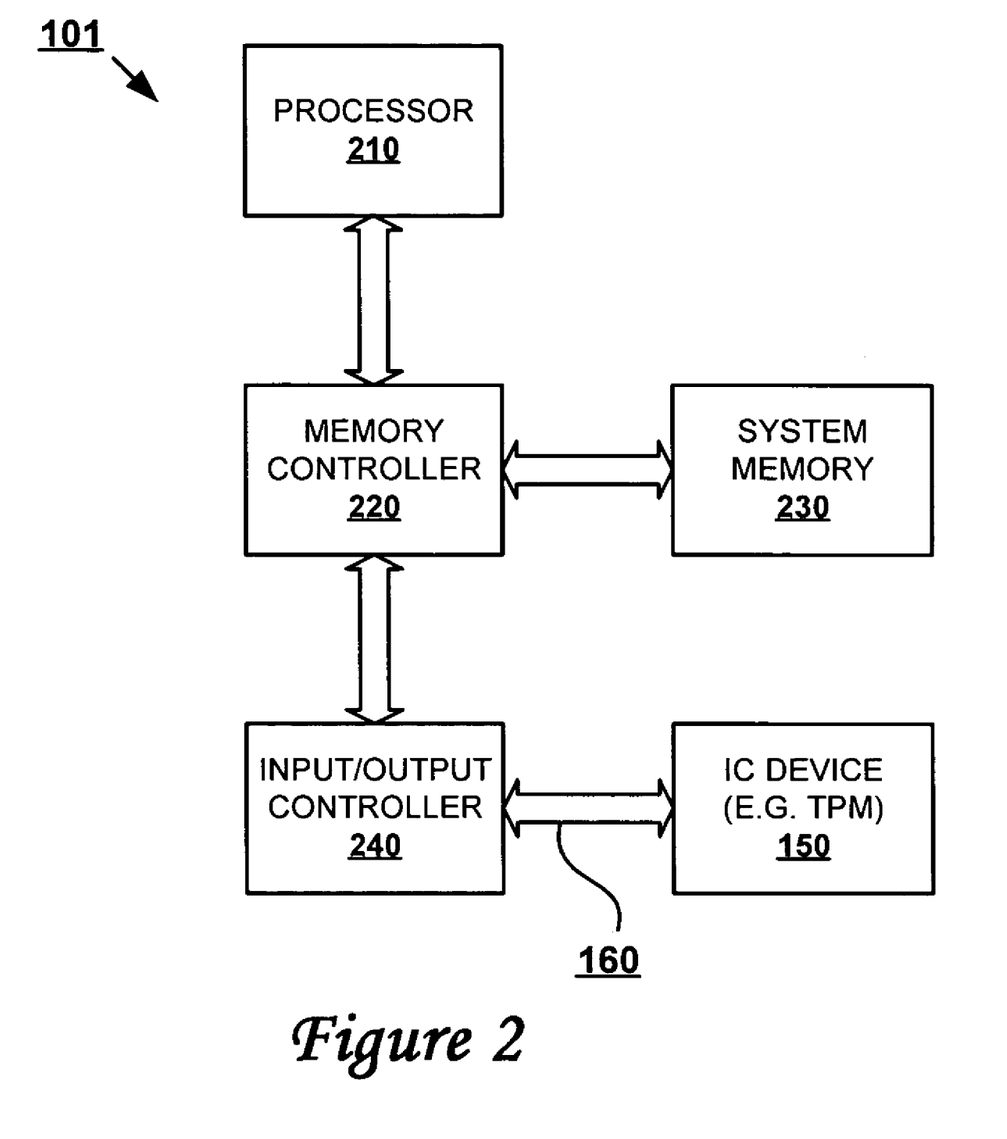
FIG. 2 is a block diagram of a customer computer system with a TPM chip according to one embodiment of the invention.

FIG. 2 illustrates an exemplary customer device or platform, which represents any one of a number of different devices that may comprise a Trusted Platform Module (TPM), designed according to the Trusted Computing Group (TCG) protocols. Specifically, device 101 comprises a processor 210, a memory controller 220, a system memory 230, an input/output (I/O) controller 240, and an integrated circuit (IC) device (i.e., TPM) 150.

The I/O controller 140 performs I/O functions and supports communications with the TPM 150 via link 160. Also, the I/O controller 140 supports communications with components coupled to other links such as a Peripheral Component Interconnect (PCI) bus, an Industry Standard Architecture (ISA) bus, a Universal Serial Bus (USB), a Firmware Hub bus, or any other bus configured with a different architecture than those briefly mentioned. I/O controller 140 may provide the connection means for linking computer system to a network and ultimately to a credential server.

Figure 3:
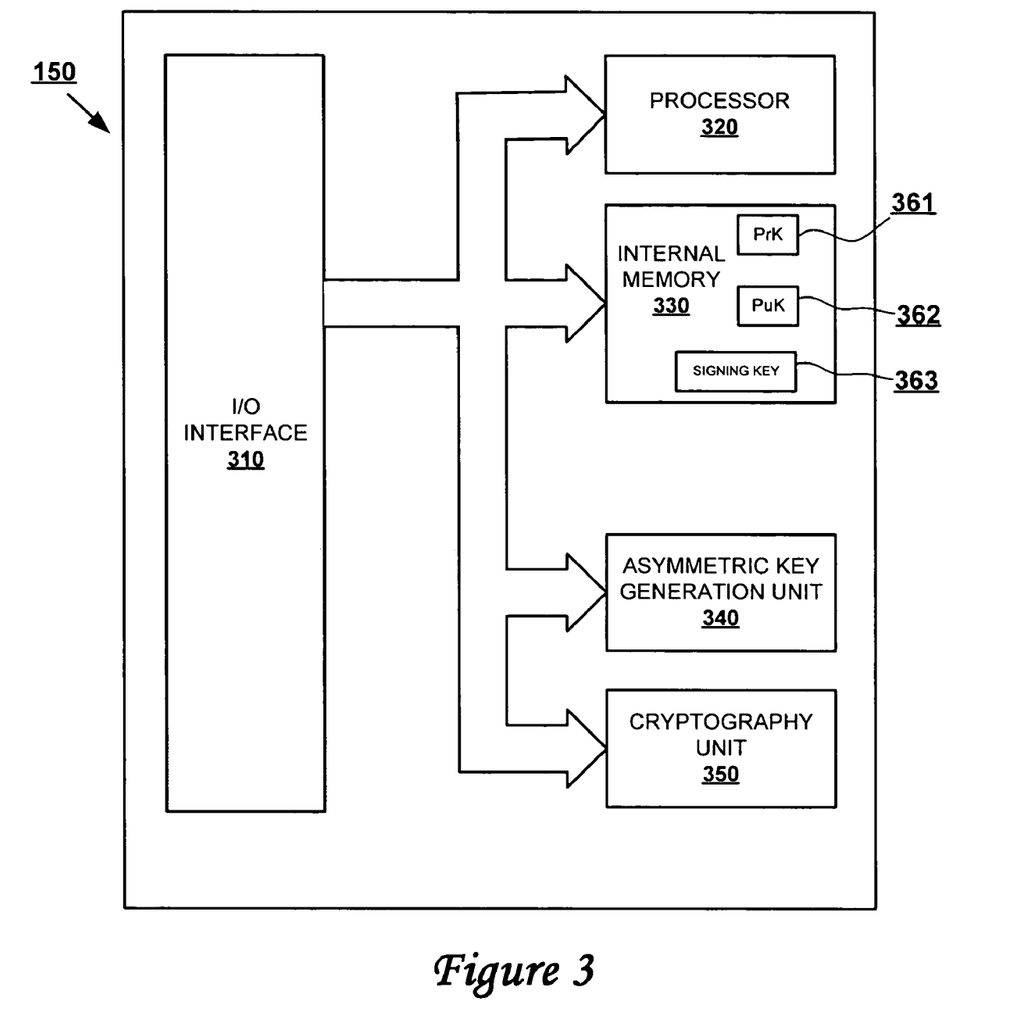
FIG. 3 is a block diagram of an exemplary TPM platform within which various implementation steps of the invention are practiced, according to one embodiment of the invention.

FIG. 3 provides an exemplary embodiment of the TPM 150 of FIGS. 1 and 2. TPM 150 comprises one or more integrated circuits placed within a protective package 300. As further shown in FIG. 3, TPM 150 comprises an input/output (I/O) interface 310, a processor 320, internal memory 330 (e.g., volatile and/or non-volatile), an asymmetric key generation unit 340 and a cryptographic engine 350. Depending on implementation, the cryptographic engine 350 may be part of the processor 320 or separate logic/component.

The asymmetric key generation unit 340 is configured to create one (or more) asymmetric key pairs, which includes an asymmetric private key 361 and a corresponding asymmetric public key 362. Each asymmetric key pair is used for encryption and decryption operations during a single communication session with another platform and may be erased after completion of the communication session either automatically or through issuance of an authenticated software command. The generated keys are stored within memory 330. Also provided and stored within memory 330 is a signing key pair 363, which, as is further described below, enables a secondary security check by which the EK certificate may be provided with knowledge that the TPM private key 361 was generated within the TPM 150. At some stage of the authentication process, the endorsement key certificate may also be stored within the memory 330 of TPM 150.

TPM 150 allows access to certain entities stored in a portion of the internal memory 330 and/or performance of selected operations by its platform only upon receipt of authorization data (e.g., endorsement certificate) by the processor 320. In order to protect the confidentiality of an signing key credential (and endorsement certificate) during transmission to and from the credential server as well as insure the integrity of the endorsement certificate, the credential server utilizes a secure data transmission mechanism. The confidentiality of transmissions is protected through encryption of the endorsement certificate. Likewise, the certificate's integrity is protected by the ability of the credential server to verify that the endorsement certificate is being transferred to a TPM and that only a specific TPM can decrypt the data.

Figure 4:
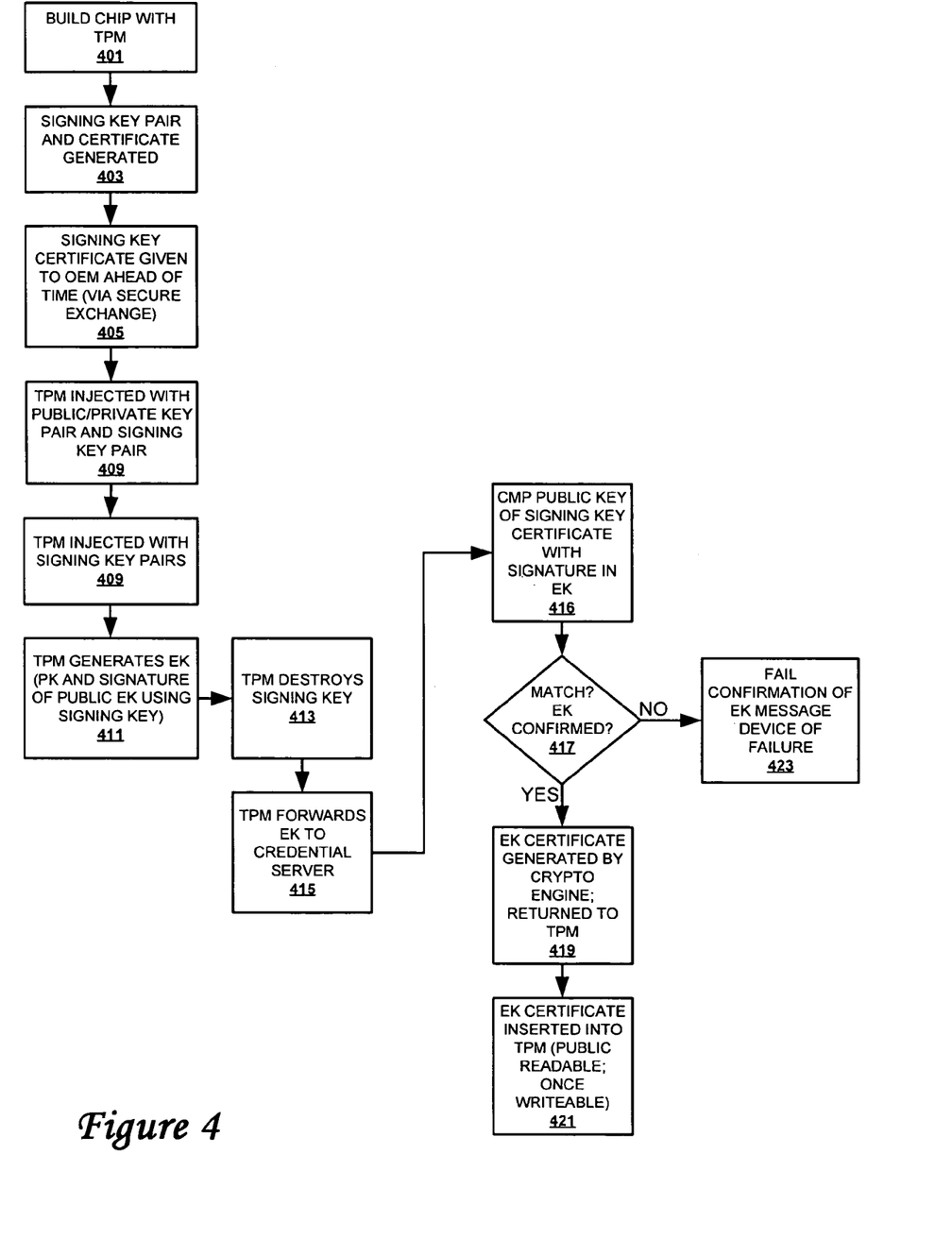
FIG. 4 is a flow chart illustrating the method of providing certificate endorsement for a TPM's endorsement key using a hashed TPM certificate in accordance with one embodiment of the invention.

FIG. 4 illustrates a flow chart of the process completed in a first embodiment of the invention. It is understood that the various steps are illustrated in a particular order simply for the present embodiment and other variations in the order of process steps (and processes with additional or fewer steps covering the same general concepts) fall within the scope of the invention.

The EK credential process is completed using a vendor generated signing key pair and associated signing key certificate. Prior to, or concurrent with, generating the devices, a TPM vendor generates a signing key pair and associated signing key certificate that are periodically changed. A first signing key pair is injected into a first set of TPMs, followed by a second signing key pair being injected into a second set of TPMs, and so on. The credential certificate for the signing key pair is also generated, and the vendor forwards this value to the OEM (credential server) ahead of time to complete the credential process. The size of the register that has to be included within the TPM is proportional to the size of a stored signing key pair, and the amount of storage space required in the credential server's database is proportional to the size of the signing key certificate.

A period, X, is identified for changing the signing key pair. X may be calculated based on a number of chips manufactured (e.g., every 1000 chips), or based on a passage of time (e.g., every 5 days), or some other basis selected by the manufacturer (or the OEM). The signing key pair and associated certificate are generated for every X machines, where X is a small enough number to discourage an attacker attempting to figure out the signing key certificate while the devices are being manufactured an authenticated and X is large enough to substantially minimize the cost of having to inject a new signing key pair every X devices. With an X value of 1000, for example, each batch of 1000 machines has the same signing key pair and signing certificate, and the next batch of 100 has a different signing key pair and signing certificate.

In an alternate embodiment, X is a time factor and represents the number of devices that can be generated within X time. The time value is selected based on the same two above criteria for the numeric value selection. Thus, with an X value of 6 hours, assuming 1500 devices are manufactured every 6 hours, then each of those 1500 devices share the same signing key pair and certificate while the next 1500 devices share a different signing key pair and certificate.

With reference now to FIG. 4, the process begins with the TPM chip being built as indicated at block 401. A TPM signing key pair and certificate are generated at step 403. The TPM vendor provides a certificate for the public signing key associated with X number of TPMs. The signing key certificate includes a copy of the public key of the signing key pair and the copy of the public signing key is used to verify the signature created for the TPMs, as described below. The TPM vendor then forwards the signing key certificate to the credential server (of the OEM) via some secure communication medium ahead of time, as illustrated at block 405. This transfer may be completed in a secure exchange and at the time the signing key pair and signing certificate are generated, which may be some time before the authentication process is actually performed. The OEM's credential server records the signing key certificate for later use during an endorsement key credential process.

The endorsement key pair and the signing key pair are injected into the TPM by the TPM vendor (per X number of devices or X time period) as shown at steps 407 and 409. The manufactured TPM chip thus comprises the public/private endorsement key pair and the public/private signing key pair stored in memory. As with standard key pairs, the public key is available for public display and may be transmitted across the network during authentication. The private key is internal to the TPM and not accessible once generated. The signing key pair is also not readable outside the TPM and is destroyed after a single use during the certificate request (or credential) process.

After the TPM (chip and/or platform) has been fabricated, the credential process is initiated. The TPM chip is installed and provided a (secure) connection to the credential server. At step 411, the TPM generates an endorsement key (EK) that comprises the public endorsement key and a signed value of the public endorsement key (signature). The generation of the EK may occur at/during manufacture of the TPM or at some later time in an environment in which the private key is protected (not revealed). The signing key pair is destroyed once the endorsement key is generated and signed as shown at step 413. This prevents unauthorized use of the number in a security attack on the TPM. Also, this necessitates a brute force attack of the secret number to be carried out across multiple TPMs, making it very unlikely for such an attack to be successful. Potential attackers are thus prevented from being able to crack the secret number.

The TPM then forwards the signed EK to the credential server as indicated at step 415. As previously described, this credential server is located within a high-value security environment that is validated by the OEM. In one embodiment, the credential server is an on-site, highly protected, FIPS-4, RSA engine (e.g., 4758 processor), which provides high-performance, very secure crypto processing. The RSA engine also knows the signing key certificate and any necessary revocation data about the shared public signing key. FIPS (or Federal Information Processing Standards) is known in the art and the specification may be found at Internet site csrc.nist-.gov/publications/fips, relevant content of which is incorporated herein by reference.

On receipt of the EK, the credential server compares the public key within the signing key certificate against the signature from the EK, as shown at step 416. A determination is made at step 417 whether the two values (of public signing keys) match. The credential server simply verifies the signature of the public key using the public key within the certificate provided by the TPM manufacturer. If the values match, then, as shown at step 419, the crypto engine of the credential server generates the EK certificate and forwards the certificate to the TPM to enable future authentication processes to be completed/authenticated. The endorsement certificate is public readable but once writeable, so that the device only needs to be certified once.

A match of the public signing key with that contained within the certificate enables the credential server to be assured that the EK came from one of its manufactured TPMs and issue the endorsement certificate for the TPM. The EK certificate is then inserted into the TPM as a once-writeable, public readable value, as shown at step 421.

However, when the signing key values do not match, the credential server generates and sends a failure confirmation message to the device similarly to the first implementation. That is, when the values do not match, the public key cannot be authenticated as coming from a secure TPM and a failure to authenticate is signaled to the customer device, as shown at block 423. This failure is also recorded along with identifying data of the customer device and the TPM vendor. This information is recorded in a "failed credential" database associated with the credential server and may be utilized to track attempts to crack the system from a particular manufacturing site (or TPM vendor).

Figure 5:
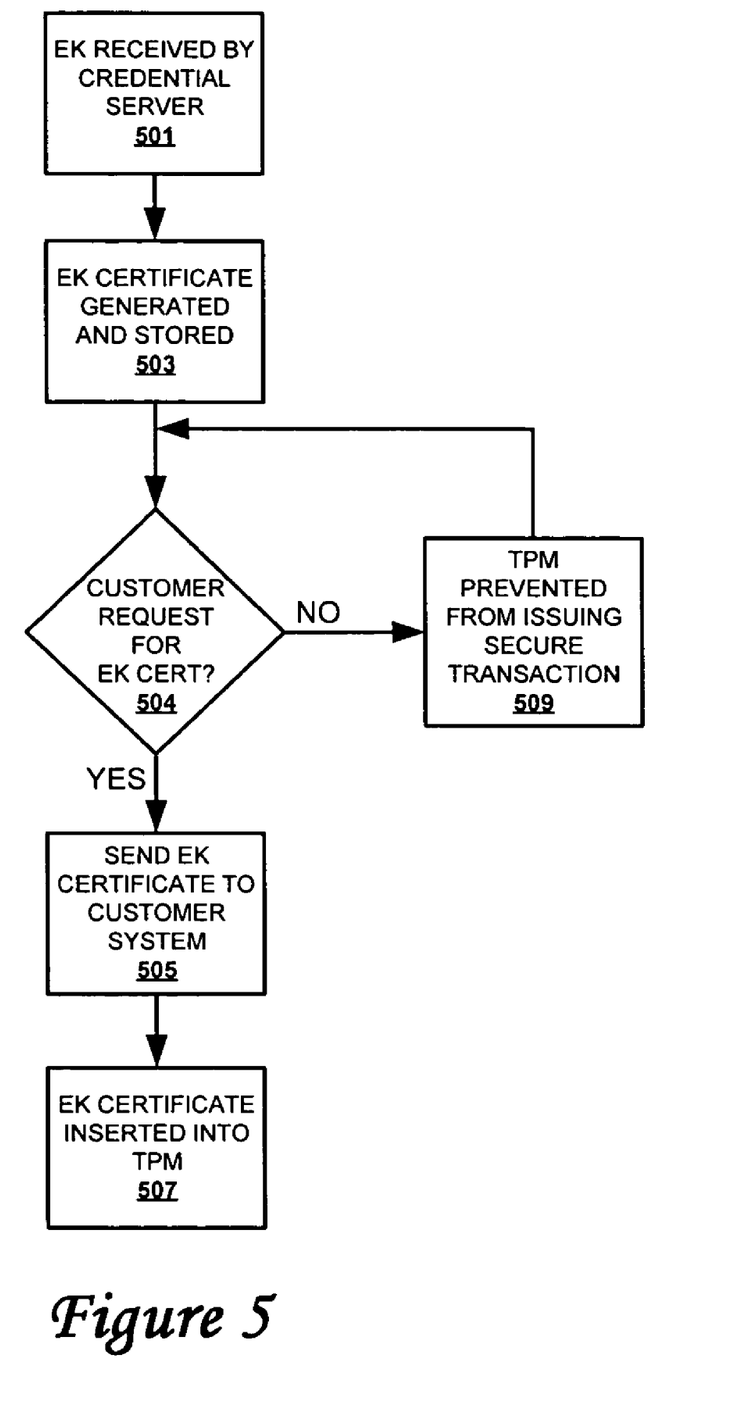
FIG. 5 is a flow chart illustrating a customer push of the certification process according to one implementation of the present invention.

FIG. 5 is a flow chart illustrating a second possible implementation of the invention (or simply a second embodiment for the previous implementation). As in the previous embodiments, the signed public endorsement key is sent to the OEM.

The credential server receives the EK at step 501 and generates the EK certificate (following confirmation by the credential process) and stores the EK in a server database, as depicted at step 503. The customer is required to request the certificate from the OEM for this TPM at some later time.

The credential server monitors for a receipt of a request from the customer computer for the EK certificate and, at step 502, a determination is whether the customer has made a request for the EK certificate. When the customer has made a request for the EK certificate, the credential server forwards the EK certificate to the customer's TPM, as shown at step 505. Notably, in another embodiment, the public endorsement key serves as a trigger that is sent by the customer at a later request time to initiate the credential process, which generates the certificate and immediately forwards the generated certificate to the requesting customer. The EK certificate is inserted within the TPM as indicated at step 507, and encryption functionality of the device is enabled. Only an approved EK certificate, based on one of the above credential processes on a specific customer device, is provided in response to a request from that specific customer. As is indicated at step 509, the TPM is not enabled with secure encryption functionality until the customer has requested and received the EK certificate.

By completing one of the two embodiments described above, a TPM manufactured at a remote location may be authenticated and provided an EK certificate from the trusted OEM. Both the OEM and users of the device are able to trust the validity of manufacturing and credential process and resulting EK certificate and private key irrespective of the location at which the device was manufactured.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for securely creating an endorsement certificate for a device in an insecure environment, said method comprising:
    generating for a valid device an endorsement key pair that includes a private key and a public key, wherein said private key is not public readable;
    creating a non-public, signing key pair that is injected into a plurality of valid devices, wherein the signing key pair is a first signing key pair that is provided to a first set of said plurality of valid devices and a second set of said plurality of valid devices are provided a second signing key pair, based on a pre-defined method for determining when to switch from utilizing said first signing key pair to utilizing said second signing key pair, said pre-defined method selected from among:
        expiration of a preset amount of device manufacturing time; and
        manufacture of a preset number of devices from the plurality of valid devices;
    verifying at a credential server that an endorsement key of a requesting device is a valid endorsement key generated during manufacture of said valid device by confirming a signature of said endorsement key is a public signing key of said signing key pair, wherein said credential server includes secure identification data of said non-public, signing key pair; and
    inserting an endorsement certificate into said device to indicate that said device is an approved device by an OEM (original equipment manufacturer) of the device only when said endorsement key is confirmed having been generated from within a valid device;
    wherein said signing key pair is a single-use parameter, said method further comprising immediately destroying said signing key pair within said device following a creation of said EK.

2. The method of claim 1, further comprising:
    providing a signing key certificate for said signing key pair, said signing key certificate including a public signing key of said signing key pair; and
    forwarding said signing key certificate via a secure communication medium to said credential server.

3. The method of claim 1, further comprising:
    signing said public key of the endorsement key pair with a public signing key of said signing key pair when creating the endorsement key (EK); and
    forwarding a resulting signed EK to said credential server to initiate a credential process.

4. The method of claim 3, further comprising:
    receiving said signed EK at said credential server;
    comparing the public signing key within the signing key certificate with a signature from the signed EK; and
    when the public signing key matches the signature, confirming said EK as originating from a valid device.

5. The method of claim 1, wherein following said verifying step said method further comprises:
    initially storing the credential in a database of said credential server;
    monitoring for a request from a customer to provide said certificate to said device; and
    following a receipt of said customer request, transmitting said certificate to said device to be inserted within the device.

6. The method of claim 1, wherein said endorsement certificate is once-writeable public-readable and is utilized for signing said public key during communication from and to said device.

7. The method of claim 1, wherein said credential server is remotely located from a vendor manufacturing said device and said method comprises transmitting said signing key pair from said device to said credential server via a secure communication medium.

8. The method of claim 1, wherein said device is a trusted platform module (TPM).

9. A TPM device manufactured and authenticated according to the steps of claim 1.

10. A data processing system comprising:
    a processor;
    a trusted platform module (TPM) chip;
    a bus for interconnecting said processor and said TPM chip;
    a network interface with communication means for connecting said TPM to a secure credential server; and means, whereby said TPM is able to verify an endorsement key pair of said TPM as being a valid pair generated during manufacture of said TPM by utilizing a signing key pair injected by a TPM vendor into the TPM during manufacture of the TPM, wherein said signing key pair is a single-use parameter, said data processing system further comprising means for immediately destroying said parameter within said device following a creation of said EK.

11. The data processing system of claim 10, wherein said signing key pair has an associated signing key certificate that is sent to the secure credential server during manufacture of the TPM and said means for verifying an endorsement key pair further comprises:

means for signing a public value of said endorsement key pair with a public signing key of said signing key pair to generate a signed (EK); and means for forwarding said signed EK to said credential server, wherein said credential server returns an endorsement certificate only when the signed EK was generated within the TPM as confirmed by a comparison of the signed EK's public signing key with a public signing key of the signing key certificate.

12. A data processing system utilized for issuing endorsement certificates, comprising:

a processor;

a memory couple to said processor via an interconnect;

a security mechanism for ensuring optimum security of processes within said data processing system;

input/output mechanism for receiving a signing key certificate from a TPM vendor for utilization during a credential process for a specific group of manufactured TPM devices; and secure communication means for receiving an endorsement key (EK) requesting issuance of an endorsement certificate, wherein said EK comprises a public endorsement key signed by a public signing key; and program means for:

determining, by utilizing said public signing key and said signing key certificate, when said EK is an EK of an endorsement key pair that was generated within one of said manufactured TPM devices;

recording when a request for EK certificate fails;

tracking each failed request to identify TPM vendors with greater than a pre-established number of failures; and messaging said TPM vendors to update their security procedures.

13. The data processing system of claim 12, further comprising means for generating a certificate only when said public signing key matches a public signing key within said signing key certificate.

14. A system for securely creating an endorsement certificate for a device in an insecure environment, said system comprising:

means for generating for a valid device an endorsement key pair that includes a private key and a public key, wherein said private key is not public readable;

means for creating a non-public, secure value that is provided to both a plurality of valid devices and a credential server, wherein the signing key pair is a first signing key pair that is provided to a first set of said plurality of valid devices and a second set of said plurality of valid devices are provided a second signing key pair, based on a pre-defined system for determining when to switch from utilizing said first signing key pair to utilizing said second signing key pair, said pre-defined system selected from among:

expiration of a preset amount of device manufacturing time; and manufacture of a preset number of devices from the plurality of valid devices;

means for verifying at a credential server that an endorsement key of a requesting device is a valid endorsement key generated during manufacture of said valid device by confirming a signature of said endorsement key is a public signing key of said signing key pair, wherein said credential server includes secure identification data of said non-public, signing key pair; and means for inserting an endorsement certificate into said device to indicate that said device is an approved device by an OEM (original equipment manufacturer) of the device only when said endorsement key is confirmed having been generated from within a valid device;

wherein said signing key pair is a single-use parameter, said system further comprising means for immediately destroying said parameter within said device following a creation of said EK.

15. The system of claim 14, further comprising:

means for providing a signing key certificate for said signing key pair, said signing key certificate including a public signing key of said signing key pair; and means for forwarding said signing key certificate via a secure communication medium to said credential server.

16. The system of claim 15, further comprising:

means for combining said public key of the endorsement key pair with a public signing key of said signing key pair when creating the endorsement key (EK); and means for forwarding a resulting signed EK to said credential server to initiate a credential process.

17. The system of claim 16, further comprising:

means for receiving said EK from said credential server;

means for comparing the copy of the public signing key within the signing key certificate with a signature from the signed EK; and means, when the public signing keys match, for confirming said EK as originating from a valid device.

18. The system of claim 14, wherein following said verifying said system further comprises:

means for initially storing the credential in a database of said credential server;

means for monitoring for a request from a customer to provide said certificate to said device; and means for following a receipt of said customer request, transmitting said certificate to said device to be inserted within the device.

19. The system of claim 14, wherein said endorsement certificate is once-writeable public-readable and is utilized for signing said public key during communication from and to said device.

20. The system of claim 14, wherein said credential server is remotely located from a vendor manufacturing said device and said system comprises means for transmitting said signing key certificate from said device to said credential server via a secure communication medium.

* * * * *